UNITED STATES PATENT OFFICE.

LOUIS M. DENNIS, OF ITHACA, NEW YORK.

METHOD OF SEPARATING BENZENEDISULFONIC ACID FROM SULFURIC ACID AND OF CONVERTING THE BENZENEDISULFONIC ACID INTO A SALT.

1,227,252.  Specification of Letters Patent.  Patented May 22, 1917.

No Drawing.    Application filed July 14, 1916.  Serial No. 109,214.

*To all whom it may concern:*

Be it known that I, LOUIS M. DENNIS, a citizen of the United States of America, residing at Ithaca, Tompkins county, New York, have invented certain new and useful improvements in methods of separating benzenedisulfonic acid from sulfuric acid and of converting the benzenedisulfonic acid into a salt by treatment with a suitable base or compound, of which the following is a specification.

In my co-pending applications Serial No. 67,535, filed Dec. 18, 1915, and Serial No. 109,213, filed July 14, 1916, I have described and claimed, both specifically and generically, subject-matter related to the present invention.

My invention relates to methods of separating benzenedisulfonic acid from sulfuric acid and the converting of the benzenedisulfonic acid into a salt of the same by treatment with a suitable base or compound.

I shall illustrate my invention by describing the making of the sodium salt of benzenedisulfonic acid although the invention is not restricted to the making of such salt only.

In carrying out my process I treat benzene with sulfuric acid, preferably with fuming sulfuric acid, to produce benzenedisulfonic acid in the presence of an excess of sulfuric acid. I treat the mixture of benzenedisulfonic acid and sulfuric acid formed by the action of sulfuric acid upon benzene, as above stated, with a solvent having the property of dissolving the benzenedisulfonic acid but of not dissolving any appreciable amount of sulfuric acid. I have found benzene suitable for the purpose. The solution of benzenedisulfonic acid thus formed which separates from the residual sulfuric acid in a distinct layer may then be brought into contact with water which dissolves out the benzenedisulfonic acid. The solvent, such as benzene, separates from this in a distinct layer and is thus set free to be used again in the extraction of further portions of benzenedisulfonic acid from a mixture of the same with sulfuric acid. Or, instead of bringing the solution of benzenedisulfonic acid into contact with water, it may be brought into contact with a suitable base or compound, such as an aqueous solution of sodium carbonate, sodium bicarbonate, sodium sulfite or preferably sodium hydroxid, or a mixture of any two or more of them, whereupon the sodium salt of the benzenedisulfonic acid, for example, separates out in solid form, being substantially insoluble in benzene for example, and is separated from the benzene by any suitable means, such as filtration, evaporation, or both. As above stated, the solvent thus set free may be used again in the extraction of further portions of benzenedisulfonic acid from a fresh mixture of the same with sulfuric acid. The sulfuric acid which remains after the benzenedisulfonic acid has been removed from it by the solvent is drawn off and used for any desired purpose.

In the sulfonation of benzene it is of course known that one or more of several sulfonic acids may be formed, the product depending upon the strength of the sulfuric acid used, the temperature at which the sulfonation is carried out and the duration of the treatment. Such sulfonic acids may be the mono-benzene sulfonic acid, the benzenedisulfonic acids with the sulfo acid group in either the meta, ortho or para positions or even higher sulfonic acid. I prefer however to so regulate the sulfonation that meta-benzenedisulfonic acid will predominate, although I do not limit myself to such form only.

It is obvious that other solvents than benzene may be used to dissolve the benzenedisulfonic acid and that other salts than the sodium salt of said acid may be produced by the use of suitable bases or other compounds or of mixtures of either of them, and where I use the term "base" or "compound" in the specification or claims I mean to include mixtures of suitable bases or compounds or mixtures of suitable bases and compounds as well. Where I use the term "insoluble" in the specification or claims I use it in its relative sense meaning that there is no appreciable solubility and where I refer to benzene or other solvent as "not dissolving" sulfuric acid, I mean not dissolving any appreciable amount.

I claim:—

1. A method of separating benzenedisulfonic acid from sulfuric acid consisting in treating a mixture of the acids with a solvent which dissolves but one of them.

2. A method of separating benzenedisulfonic acid from sulfuric acid consisting in treating a mixture of the acid with a solvent which dissolves the benzenedisulfonic acid but not the sulfuric acid.

3. A method of separating benzenedisulfonic acid from sulfuric acid consisting in treating a mixture of the acids with an organic solvent which dissolves the benzenedisulfonic acid but not the sulfuric acid.

4. A method of separating benzenedisulfonic acid from sulfuric acid consisting in treating a mixture of the acids with benzene.

5. A method of making a salt of benzenedisulfonic acid consisting in dissolving the benzenedisulfonic acid in a solvent in which the salt is relatively insoluble and treating the solution with a suitable compound to form the salt.

6. A method of making a salt of benzenedisulfonic acid consisting in dissolving the benzenedisulfonic acid in an organic solvent in which the salt is relatively insoluble and treating the solution with a suitable compound to form the salt.

7. A method of making a salt of benzenedisulfonic acid consisting in dissolving the benzenedisulfonic acid in benzene and treating the solution with a suitable compound to form the salt.

8. A method of making the sodium salt of benzenedisulfonic acid consisting in dissolving the benzenedisulfonic acid in benzene and treating the solution with a suitable sodium compound.

9. A method of making the sodium salt of benzenedisulfonic acid consisting in dissolving benzenedisulfonic acid in benzene and treating the solution with an aqueous solution of sodium hydroxid.

10. A method of making a salt of benzenedisulfonic acid consisting in dissolving the benzenedisulfonic acid in a solvent in which the salt is relatively insoluble, treating the solution with an aqueous solvent to dissolve and retain the benzenedisulfonic acid and with a substance which will convert the acid into a salt.

11. A method of making a salt of benzenedisulfonic acid consisting in dissolving the benzenedisulfonic acid in an organic solvent in which the salt is relatively insoluble, treating the solution with an aqueous solvent to dissolve and retain the benzenedisulfonic acid and with a substance which will convert the acid into a salt.

12. A method of making a salt of benzenedisulfonic acid consisting in dissolving the benzenedisulfonic acid in benzene, treating the solution with an aqueous solvent to dissolve and retain the benzenedisulfonic acid and with a substance which will convert the acid into a salt.

13. A method of making the sodium salt of benzenedisulfonic acid consisting in dissolving the benzenedisulfonic acid in benzene, treating the solution with an aqueous solvent to dissolve and retain the benzenedisulfonic acid and with a suitable sodium compound which will convert the acid into a salt.

14. A method of making the sodium salt of benzenedisulfonic acid consisting in dissolving the benzenedisulfonic acid in benzene, treating the solution with an aqueous solvent to dissolve and retain the benzenedisulfonic acid and with sodium hydroxid to convert the acid into a salt.

15. A method of separating benzenedisulfonic acid from sulfuric acid and converting the benzenedisulfonic acid into a salt of the acid consisting in treating a mixture of the acids with a solvent which dissolves the benzenedisulfonic acid, but not the sulfuric acid, separating the solution of benzenedisulfonic acid from the sulfuric acid and treating the solution with a suitable compound to form a salt relatively insoluble in the original solvent.

16. A method of separating benzenedisulfonic acid from sulfuric acid and converting the benzenedisulfonic acid into a salt of the acid consisting in treating a mixture of the acids with benzene, separating the benzene solution of benzenedisulfonic acid from the sulfuric acid and treating the solution with a suitable compound to form a salt relatively insoluble in benzene.

17. A method of separating benzenedisulfonic acid from sulfuric acid and converting the benzenedisulfonic acid into the sodium salt of the acid consisting in treating a mixture of the acids with benzene, separating the benzene solution of benzenedisulfonic acid from the sulfuric acid and treating the solution with an aqueous solution of a suitable sodium compound.

18. A method of separating benzenedisulfonic acid from sulfuric acid and converting the benzenedisulfonic acid into the sodium salt of the acid consisting in treating a mixture of the acids with benzene, separating the benzene solution of benzenedisulfonic acid from the sulfuric acid and treating the solution with an aqueous solution of sodium hydroxid.

19. A method of separating benzenedisulfonic acid from sulfuric acid and converting the benzenedisulfonic acid into a salt of the acid consisting in treating a mixture of the acids with benzene, separating the benzene solution of benzenedisulfonic acid from the sulfuric acid, treating the solution with a suitable compound to form a salt relatively insoluble in benzene, drawing off the benzene freed from the salt of the benzenedisulfonic acid and returning the same to a fresh portion of the mixed acids.

20. A method of separating benzenedisulfonic acid from sulfuric acid consisting in treating a mixture of the acids with benzene, drawing off the benzene solution of benzenedisulfonic acid, freeing the benzene from the benzenedisulfonic acid and returning the benzene to a fresh portion of the mixed acids.

21. A method of separating benzenedisulfonic acid from sulfuric acid consisting in treating a mixture of the acids with benzene, drawing off the benzene solution of benzenedisulfonic acid, freeing the benzene from the benzenedisulfonic acid by treating the solution with an aqueous solvent to dissolve and retain the benzenedisulfonic acid and returning the benzene to a fresh portion of the mixed acids.

22. A method of making a salt of benzenedisulfonic acid consisting in treating a mixture of benzenedisulfonic acid and sulfuric acid with benzene, separating the benzene solution of benzenedisulfonic acid from the sulfuric acid, freeing the benzene from the benzenedisulfonic acid by treating the solution with an aqueous solvent to dissolve and retain the benzenedisulfonic acid and with a substance which will convert the acid into a salt.

In testimony whereof I have signed this specification.

LOUIS M. DENNIS.